United States Patent [19]

Dollhopf

[11] Patent Number: 5,103,689

[45] Date of Patent: Apr. 14, 1992

[54] CO-ROTATING DUAL OUTPUTS TWIN SCREW EXTRUDER WITH AXIAL OFFSET PINIONS

[75] Inventor: Rüdiger Dollhopf, Herbolzheim, Fed. Rep. of Germany

[73] Assignee: Rhone-Poulenc Rhodia Aktiengesellschaft, Freiburg, Fed. Rep. of Germany

[21] Appl. No.: 533,287

[22] Filed: Jun. 5, 1990

[30] Foreign Application Priority Data

Dec. 11, 1989 [DE] Fed. Rep. of Germany ....... 3940833

[51] Int. Cl.⁵ .............................................. F16H 37/06
[52] U.S. Cl. ............................ 74/665 GA; 74/665 G
[58] Field of Search ........... 74/665 GA, 665 G; 425/207; 366/83, 218; 475/6, 174, 332

[56] References Cited

U.S. PATENT DOCUMENTS

| 3,824,875 | 7/1974 | Willert et al. | 74/665 GA |
| 4,144,775 | 3/1979 | Schäfer | 74/665 GA |
| 4,253,345 | 3/1981 | Münster | 74/665 GA |
| 4,315,440 | 2/1982 | Chszaniecki | 74/665 GA X |
| 4,586,402 | 5/1986 | Schäfer | 74/665 GA X |
| 4,679,461 | 7/1987 | Mizuguchi et al. | 74/665 GA |
| 4,899,620 | 2/1990 | Schiffer | 74/665 GA X |

FOREIGN PATENT DOCUMENTS 1729149 9/1967 Fed. Rep. of Germany .
2619019 11/1977 Fed. Rep. of Germany .

Primary Examiner—Leslie A. Braun
Assistant Examiner—Khoi Q. Ta
Attorney, Agent, or Firm—Bucknam and Archer

[57] ABSTRACT

A gearing with two axis-parallel output shafts (2, 3) rotating in the same direction, for operation of a double screw extruder, has two pinions (4, 7) of equal size which are arranged in the annular space between an internally toothed ring gear (6) and an intermediate gear (5) in the spacing of the screws of the double screw extruder and mesh with the intermediate gear (5) and with the ring gear (6). The first of the two pinions (4) is arranged on the driving shaft (1), which is extended as output shaft (2). The second pinion (7) is arranged on the second output shaft (3). The gearing permits torque division of the torque from the driving shaft (1) to the two output shafts (2, 3).

11 Claims, 3 Drawing Sheets

CO-ROTATING DUAL OUTPUTS TWIN SCREW EXTRUDER WITH AXIAL OFFSET PINIONS

This invention relates to a gearing with two axis-parallel output shafts rotating in the same direction in particular for driving a double screw extruder, with driving and output pinions of equal size, the teeth of which engage with a larger intermediate gear designed as central pinion and with a revolving internally toothed ring gear.

BACKGROUND OF THE INVENTION

This gearing as part of an apparatus with one or more screws, in particular an extruder, has been described in DE-AS 1729149. There are provided in the known extruder gearings an intermediate gear arranged coaxially in the ring gear and a total of four pinions of equal size which mesh on one hand with the internal teeth of the ring gear and on the other hand with the external teeth of the intermediate gear. Two of the four pinions work as output pinions and the other two as driving pinions. The two driving pinions, which are spaced from each other somewhat more than the two output pinions, are approximately radially opposite to the output pinions, which serve to drive co-rotational double screws and accordingly are arranged close together.

The known gearing with four pinions requires a reduction gear for power division or torque division over the two driving pinions.

From DE-PS 2619019 is known an extruder gearing similar to the discussed above gearing, the intermediate gear of which meshes only with a driving pinion referred to as central pinion and with the internal teeth of the ring gear. The central pinion further is in engagement with an output pinion, which also meshes with the internal teeth of the ring gear. The center axes of all gears and pinions lie in a plane along the diameter of the ring gear.

The central pinion is disposed on a continuous input and output shaft and has the same diameter as the output pinion, while the diameter of the intermediate gear is double the diameter of the pinion and one-half the size of the ring gear diameter. As the central pinion and the output pinion mesh, only extruders with counter-rotating double screws can be driven by the known extruder gearing.

SUMMARY OF THE INVENTION

One object of the invention is to provide a cost-efficient gearing for machines with two shafts rotating in the same direction, in particular double screw extruders of high outputs and delivery pressures which, being of simple design, ensure long useful life and tool life.

In a gearing of the kind mentioned hereinabove, this problem is solved because a single driving shaft is provided which is designed at the same time as a first output continuous shaft and extending beyond the driving pinion, there is only one driving pinion, and the output pinion, of which there is also only one, is disposed offset to the second output shaft in circumferential direction of the intermediate gear by the distance between the two screws of the double screw extruder.

Due to the fact that the torque introduction occurs by means of a single driving shaft and that one pinion delivers torque while the other receives torque, a preliminary torque division with a separate torque-splitting gearing can be dispensed with, since the gearing according to the invention, despite its simpler overall construction, has additionally the function of a torque dividing gear and not only the function of a torque transmission gear.

In a preferred embodiment of the invention, the driving and output pinions have a diameter which is greater than the distance between the two co-rotational screws of the double screw extruder. The driving and output pinions are arranged offset from each other in axial direction, or inter-penetration of the pinions becomes possible due to the fact that one pinion is made axially longer and with a recess into which the other axially shorter pinion penetrates. Thus the result is achieved that the torsions of the screw shafts are the same and the spacing gap between the extruder screws can be kept small.

In order to completely preclude the effect of manufacturing tolerances on the quality of the torque division and hence on the load on the tooth profile and their wear, a further development of the invention provides that the ring gear and the intermediate gear are mounted in a cage which is disposed floating relative to the gear housing containing the driving and output shafts. With such an arrangement the possibly existing manufacturing tolerances of the four gears involved are compensated due to the fact that the cage brings itself automatically into a position for which a uniform torque division over a quarter torque of the total torque in each instance is ensured. The stress and wear of the gears is then optimally low.

Since the reaction forces of the ring gear and of the intermediate gear are equal in amount but opposite in direction, they neutralize each other in the cage. The cage, freely rotatable in itself, is held in a certain position by a locking device, so that it will not run up against one of the two shafts for which openings are provided in the cage. The locking device must absorb only one-half the force which results from the different rolling resistances of the bearings of the ring gear and of the intermediate gear. This force, however, is quite small. The second half of this force is absorbed through the driving and output pinions at their radial suspension, due to which they sustain a small but directional load, a fact which is of advantage for their useful life.

For the purpose of obtaining equality of torsion of the two output shafts at the screw, the driving pinion mounted on the continuous driving and output shaft may, according to an embodiment of the invention, be arranged offset axially in the direction of the driving shaft, while the output shaft has a shaft section of increased diameter in the vicinity of the driving pinion. The diameter and the length of the strengthened shaft section are so dimensioned that the axial offset of the torque introduction is compensated.

BRIEF DESCRIPTION OF THE DRAWINGS

Other advantageous embodiments of the invention will be evident from the dependent claims and from the following description of the examples of reduction to practice. In the drawings:

FIG. 1 shows in cross-section a gear scheme for a torque dividing gearing, which can be used as torque-dividing extruder gearing for extruders with two co-rotational shafts, as they are used, for example, in two-screw extruders. Besides the use in extruders, the gearing illustrated schematically in FIG. 1 can be used also for other co-rotational two-shaft machines with small shaft spacing. The gearing illustrated schematically in FIG. 1 permits a torque division from one shaft to two shafts, and in particular a division of the drive torque over two screw shafts of an extruder is possible.

Figure 2:
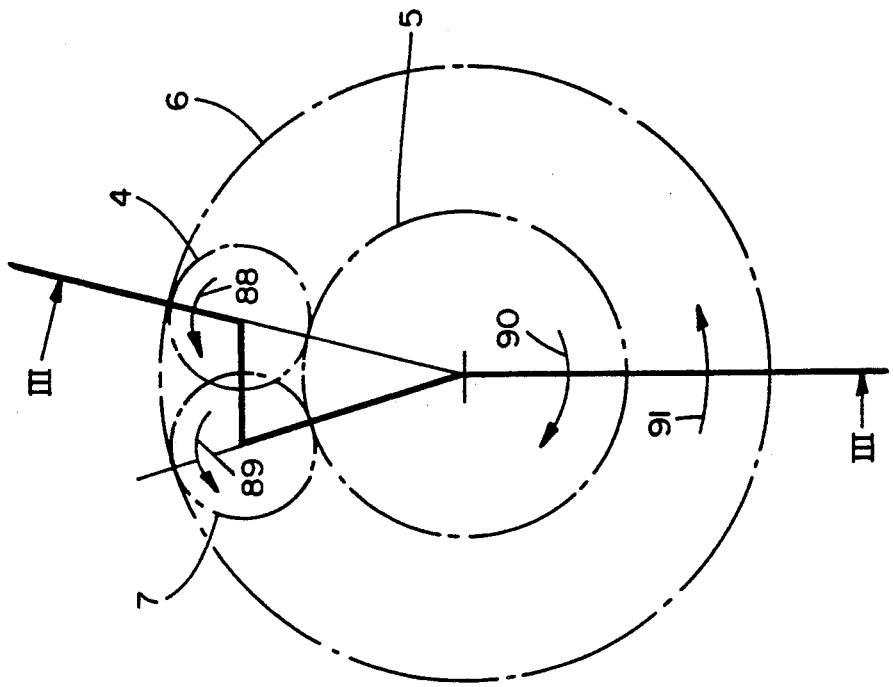
FIG. 2 is a gear scheme of a gearing with enlarged pinion diameters to obtain smaller tooth profile forces with the output shaft spacing remaining the same.
Figure 3B:
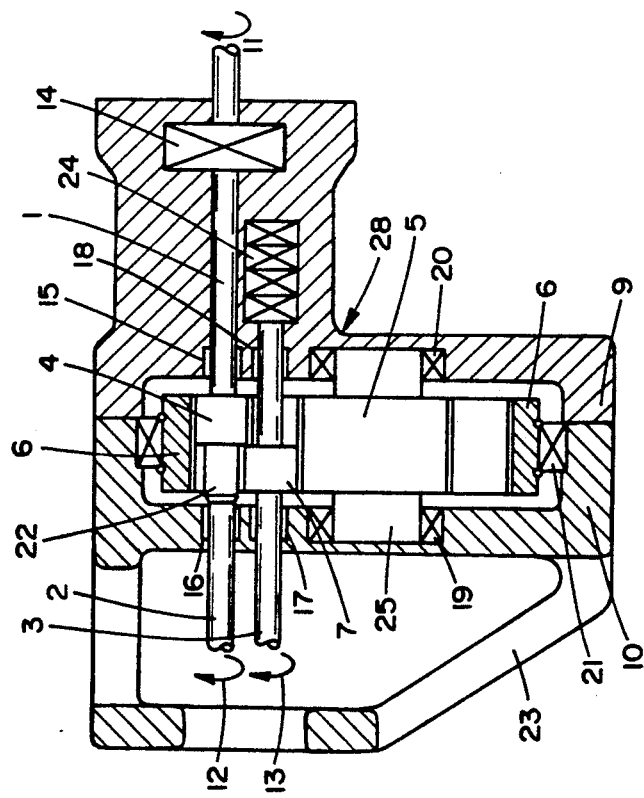
FIG. 3B is a gearing according to the invention in longitudinal section along line III—III in FIG. 2.

The introduction of a torque occurs via a driving shaft 1, shown in FIG. 3B, which shows a gearing in longitudinal section, the scheme of which is represented schematically in cross-section in FIG. 2. The gearings shown in the drawing permit a torque division of the torque introduced at the driving shaft 1 over a first output shaft 2 and a second output shaft 3, shown in FIG. 3B.

Figure 1:
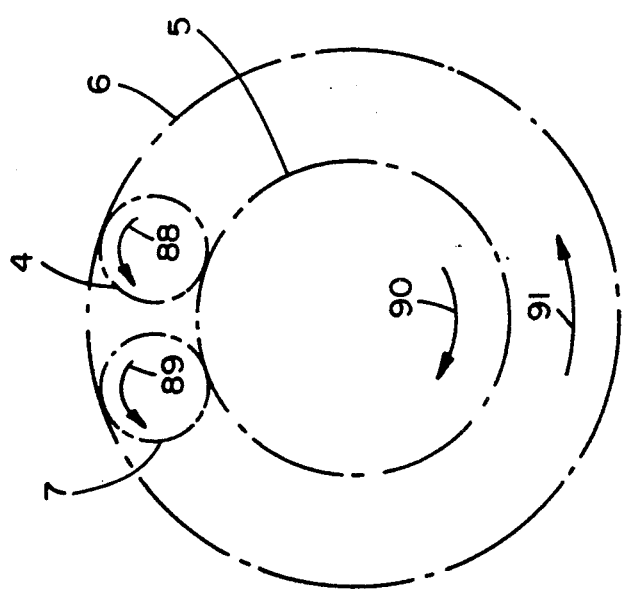
FIG. 1 is a gear scheme of a gearing according to the invention in cross-section.
Figure 3A:
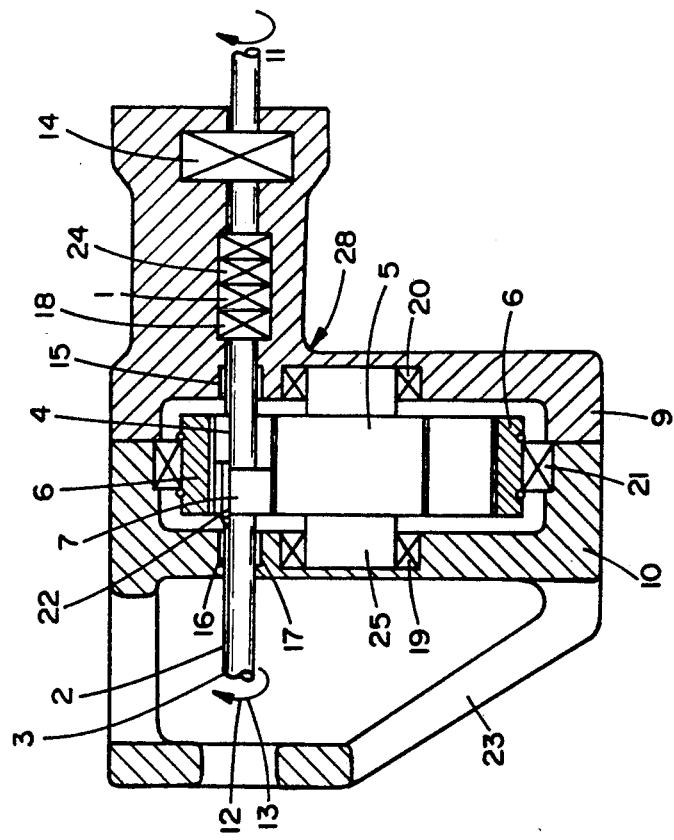
FIG. 3A is a longitudinal cross section of FIG. 2.

In a gearing with a gear scheme according to FIG. 1, the driving shaft 1 is connected with a driving pinion 4 through which introduction of the torque into the gearing occurs. On the side of the driving pinion 4 opposite the driving shaft 1 is the first output shaft 2, and the driving shaft 1 and the first output shaft 2 may be formed as a continuous shaft on which the driving pinion 4 is non-rotationally disposed.

The driving pinion 4 meshes with a free-running intermediate gear 5 shown in all figures of the drawing, with external teeth and a freely revolving internally toothed ring gear 6 concentric with the intermediate gear 5, as can be seen in particular in FIG. 1.

In the plane defined by the driving pinion 4, the intermediate gear 5 and ring gear 6, at a lateral distance from the pinion 4 corresponding to the shaft spacing of the extruder, there is an output pinion 7, the diameter of which and the number of teeth match the diameter and the number of teeth of the driving pinion 4. The output pinion 7 is disposed non-rotationally on the second output shaft 3, which in the scheme of FIG. 1 lies, for example, below the paper plane, as does also the first output shaft, while the driving shaft 1 protrudes from the paper plane.

When the output shafts 2 and 3, on which the pinions 4 and 7 are disposed, are braked by an extruder and when a torque is introduced through the driving shaft 1 connected with driving pinion 4, there occurs, in the case of the gear construction shown schematically in FIG. 1, a torque division such that one-half of the introduced torque is transmitted directly through the continuous driving shaft 1 and the first output shaft 2. Of the remaining partial torque one-half is transmitted from the driving pinion 4 to the ring gear 6 and the second half from the driving pinion 4 to the intermediate gear 5. Thus one tooth engagement transmits in each instance one-fourth of the total torque. Arrows 88, 89, 90, 91 indicate in FIG. 1 the direction of rotation of each of the respective gears.

The intermediate gear 5 and the ring gear 6 transmit in each instance one-quarter torque to the output pinion 7, whereby the latter receives, upon the double torque introduction occuring in this manner with a double tooth engagement, in all one-half of the torque introduced into the gearing via the driving shaft 1.

In the scheme shown in FIG. 1, as distinguished from FIG. 3B, the pinions 4 and 7 are not axially offset but are arranged in the same plane. To obtain small tooth profile forces, it is appropriate to make the pinions 4 and 7 as large as possible for a given distance between the output shafts 2 and 3. FIGS. 2 and 3B show how this can be achieved by interpenetration of the driving pinion 4 and output pinion 7. At given tooth forces this arrangement makes it possible to increase the transmittable torque.

The interpenetration of the pinions 4 and 7 occurs best by a mutual axial displacement of the driving pinion 4 and the output pinion 7 as shown in FIG. 3B. Another possibility not illustrated in the drawing is to provide one of the pinions 4, 7 with an annular groove which offers a free space for the other pinion to penetrate into.

FIGS. 2 and 3B illustrate an arrangement according to which the two pinions 4 and 7 are axially offset, the axial length of the pinions being approximately one-half the axial length of the intermediate gear 5 and of the ring gear 6.

FIG. 3B illustrates this feature as well as other details of the gearing which do not appear in FIG. 2.

Due to the offset arrangement, the intermediate gear 5 and the ring gear 6 wear down only half as much as compared with an arrangement in one plane. The advantage of this arrangement is that the two output shafts 2 and 3 deviate less from their original position relative to each other in the course of service. The result of such an alteration due to wear is a reduction of the flank spacing between the extruder screws with increasing risk of mutual contact.

The example shown in FIG. 3B for a torque-splitting gear has a housing 28 with a first housing half 9 and a second housing half 10.

The driving shaft 1 protrudes from housing 28 at right in FIG. 3B and transmits the torque, illustrated by arrow 11, to the output shafts 2 and 3 pointing to the left, with a torque illustrated by arrows 12 and 13 which is in each instance one-half the introduced torque. The output shafts 2 and 3 are co-rotational and rotate in the same direction as the driving shaft 1.

Driving shaft 1 is mounted in an axial thrust bearing 14 for absorption of the axial forces of the first screw shaft of the extruder. In a preferred example of the invention, the driving shaft 1 has a diameter which is about 1.26 times the diameter of the output shaft 2. The housing halves 9 and 10 contain radial bearings 15, 16 visible in the drawing, for the continuous driving shaft 1 with the output shaft 2; they, as well as the radial bearings 17 and 18 for the second output shaft 3 and the radial bearings 19 and 20 for the intermediate gear 5, may be conventional, uncorrected radial bearings. Suspension of the ring gear 6 by means of a radial bearing 21 is no problem.

Because of the torque take-off or absorption, offset by 108°, at the pinions 4 and 7 and the common axis of rotation of the intermediate gear 5 and ring gear 6, the reaction forces acting on the driving pinion 4 and those acting on the output pinion 7 neutralize each other. This means that these two pinions are free from flexures and their radial suspensions are free from forces. Therefore they are practically without load.

FIG. 3B shows at the left of the driving pinion 4 a shaft section 22 which because of its greater diameter is reinforced. In this manner equality of torsion can be obtained on the screw side if the diameter of the shaft section 22 and its length are so dimensioned that the axial offset of the torque introduction is compensated as a result of the axial offset between the pinions 4 and 7.

Further, FIG. 3B show that in the left or second housing half 10 openings are provided, and in particular a passage opening 23 through which extend the output shafts 2 and 3 which are connected with the screw shafts of the extruder. The second output shaft 3 ends on the side turned away from the extruder in an axial bearing 24 which is designed as a staggered axial bearing with a small diameter. It should be mentioned also that the diameter of the free-running shaft 25 of the intermediate gear 5 is great, so that the flexing of the intermediate gear 5 is negligible and commercial, uncorrected radial bearings 19, 20 may be used. Even more so the ring gear 6 can be made large, so that its flexure too is practically negligible. Suspension by the radial bearing 21 of the ring gear 6 is no problem in view of its size.

Figure 4A:
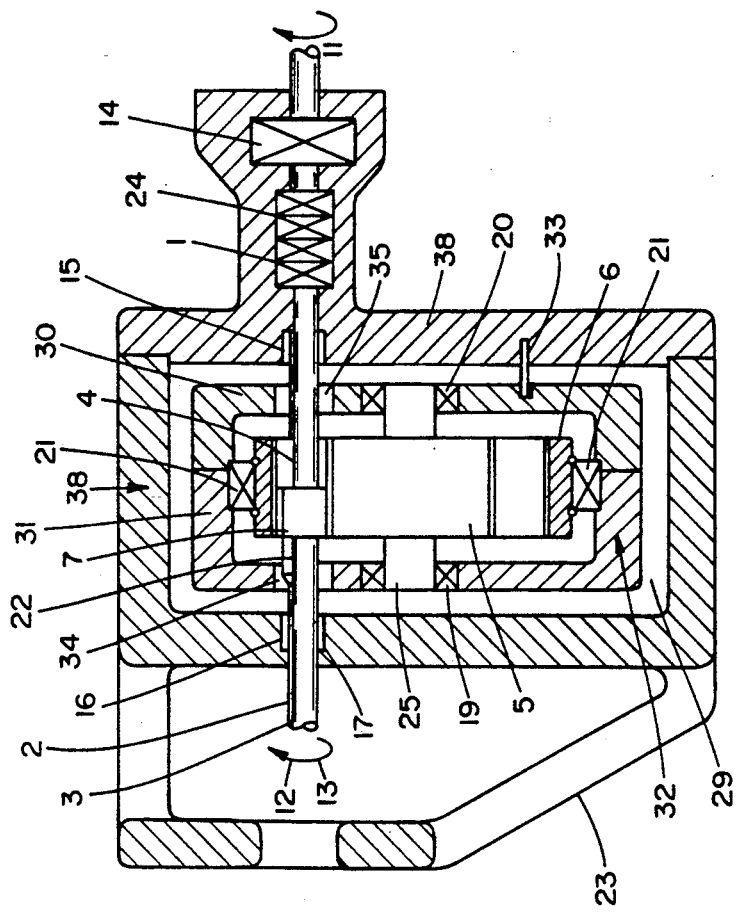
FIG. 4A is a longitudinal cross section of an embodiment of the invention with the gearing according to FIG. 2.
Figure 4B:
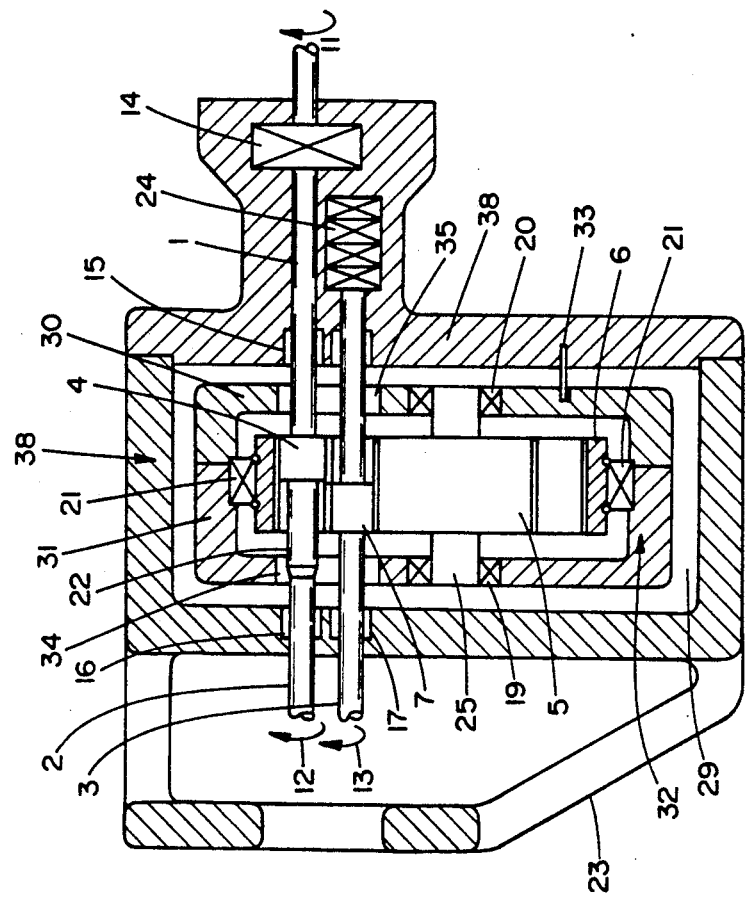
FIG. 4B is a gearing according to the invention in longitudinal section where the ring gear and the intermediate gear of the gearing are mounted in a cage disposed floating relative to the gear housing.

FIG. 4B illustrates a particularly advantageous embodiment of the gearing according to the invention, according to which the effect of manufacturing tolerances may be eliminated.

The two-part gear housing 38 shown in FIG. 4B has a cavity 29 for receiving a cage 32 consisting of a first part 30 and a second part 31. Disposed in cage 32 is the radial bearing 21 for the revolving ring gear 6, which in the example shown in FIG. 3B is secured to the housing 28.

The radial bearing 20, which in the example of FIG. 3B is supported in the housing 28, for the intermediate gear 5, is likewise contained in cage 32 in the example shown in FIG. 4B. For this reason, intermediate gear 5 and ring gear 6, together with cage 32, form a structural unit which through the pinions 4 and 7 is movably guided in the cavity 29 of gear housing 38. Cage 32 is merely secured against co-rotation by a locking device 33. Possibly existing manufacturing tolerances of the four gears involved are compensated due to the fact that cage 32 automatically brings itself into a position which ensures a uniform torque division over one-quarter torque at the teeth flanks in each instance. Thus the wear and load on the gears in question are optimally low. By means of a force diagram it can be shown that the reaction forces of the ring gear 6 and intermediate gear 5 are transmitted into cage 32 and neutralize each other therein because of their equal size but opposite direction.

The locking device 33, for example a pin, holds the cage 32, which in itself is freely rotatable, in a certain position so that the edge of the two passage openings 34, 35 will not run up against one of the shafts 1, 2, 3. The locking device 33 must absorb only one-half of the force which results from the different rolling resistance of the radial bearings 19, 20 on one hand and of the radial bearing 21, on the other. This force, however, is quite small, and the second half of this force is absorbed through the two pinions 4 and 7 at their radial suspension 15, 16, 17, 18, due to which they have a small but directional load, and this fact is advantageous for their useful life.

As is evident from a comparison of FIGS. 3B and 4B, the two gearings are identical in the features not related to the cage 32. The housing 38 has, aligned with the passage openings 34 and 35, the opening 23 already mentioned in connection with FIG. 3B, as well as recesses for the axial bearings 14 and 24 and the radial bearings 15, 16, 17 and 18.

What is claimed is:

1. A gearing for operation of a co-rotational two-shaft machine, in particular an extruder having two screws arranged at a distance which comprises:
    a) an intermediate gear (5);
    b) an internally toothed ring gear (6);
    c) two pinions (4 and 7) of equal size having teeth and meshing with both said intermediate gear (5) and said internally toothed ring gear (6), one of said pinions being the driving pinion (4) and the second pinion being the output pinion (7),
    d) a single driving shaft (1) which extends at one end of the gearing beyond said driving pinion (4) and is connected thereto,
    e) two axis parallel output shafts (2, 3) at the other end of the gearing, said pinions being mounted on said output shafts, said driving pinion (4) being also located on said driving shaft, said pinion (7) being arranged on the second output shaft (3);
    f) said output pinion (7) being arranged offset with respect to said driving pinion (4) in the axial direction by said distance between said two screws of the extruder,
    g) the first output shaft (2) being arranged on the side of the driving pinion (4) opposite the driving shaft, said driving shaft and said first output shaft (2) forming a continuous shaft.

2. The gearing according to claim 1 wherein said driving and output shafts are contained in a gear housing (38) said driving and output shafts having bearings (14, 15, 16, 17, 18, 24), the ring gear (6) and the intermediate gear (5) are mounted in a cage (32), which is disposed floating relative to said gear housing (38), said gear housing containing said bearings of the driving and output shafts (1, 2, 3).

3. The gearing according to claim 2 wherein the driving pinion (4) mounted on the continuous driving and output shaft (1, 2) overlaps the output pinion and the output shaft (2) in the vicinity of the driving pinion (4) has a shaft section (22) of greater diameter.

4. The gearing according to claim 1 wherein the driving pinion (4) and the output pinion (7) have a diameter greater than said distance between said screws of the extruder.

5. The gearing according to claim 1, characterized by the fact that the diameters of the two pinions (4, 7) are greater than the radial distance between the output shafts (2, 3), and the pinions (4, 7) are disposed axially offset relative to each other.

6. The gearing according to claim 1, characterized by the fact that the diameter of each of the two pinions (4, 7) is greater than the distance between the axes of the two output shafts (2, 3), one pinion being axially longer and being provided with a recess into which the other, axially shorter pinion penetrates.

7. The gearing according to claim 1 characterized by the fact that the driving shaft (1) has a greater diameter than the two output shafts (2, 3).

8. The gearing according to claim 1, characterized by the fact that the intermediate gear (5) and the ring gear (6) are arranged coaxially with each other.

9. The gearing according to claim 7, characterized by the fact that the diameter of the driving shaft (1) is approximately 1.26 times the diameter of the output shaft (2).

10. The gearing according to claim 2, characterized by the fact that the cage (32) has a locking device (33).

11. The gearing according to claim 10, characterized by the fact that the locking device (33) is a pin disposed radially relative to the pinions (4, 7), said pin bridging the interspace (29) between the cage (32) and the inner side of the gear housing (38) and permitting movement of the cage only within a given range.

* * * * *